United States Patent [19]

Price et al.

[11] Patent Number: 5,174,812
[45] Date of Patent: Dec. 29, 1992

[54] SEPARATION AND RECOVERY OF NICKEL AND COBALT IN AMMONIACAL SYSTEMS

[75] Inventors: Malcolm J. Price; John G. Reid, both of Townsville, Australia

[73] Assignee: MEQ Nickel Pty., Ltd., Queensland, Australia

[21] Appl. No.: 439,377

[22] PCT Filed: May 19, 1988

[86] PCT No.: PCT/AU88/00144
§ 371 Date: May 14, 1990
§ 102(e) Date: May 14, 1990

[87] PCT Pub. No.: WO88/09389
PCT Pub. Date: Dec. 1, 1988

[30] Foreign Application Priority Data

May 20, 1987 [AU] Australia ............................. PI2018

[51] Int. Cl.$^5$ ............................................. C22B 3/00
[52] U.S. Cl. ..................................... 75/628; 423/139; 423/143; 75/626
[58] Field of Search .................. 423/139, 141, 143; 75/353, 626, 628

[56] References Cited

U.S. PATENT DOCUMENTS

| | | | |
|---|---|---|---|
| 2,913,355 | 11/1959 | Dean | 423/143 |
| 3,276,863 | 10/1966 | Drobnick et al. | 423/139 |
| 3,438,768 | 4/1969 | Ashbrook et al. | 423/139 |
| 3,988,151 | 11/1976 | Skarbo et al. | 423/139 |
| 4,005,173 | 1/1977 | Pemsler et al. | 423/139 |
| 4,083,915 | 4/1978 | Hubred et al. | 423/139 |
| 4,278,463 | 6/1981 | Vanderpool et al. | 75/353 |
| 4,619,816 | 10/1986 | Rickelton | 423/139 |

Primary Examiner—Prince Willis, Jr.
Assistant Examiner—Edward Squillante
Attorney, Agent, or Firm—Venable, Baetjer, Howard & Civiletti

[57] ABSTRACT

A process for the separation and recovery of nickel from an ammoniacal ammonium carbonate liquor containing nickel II ions and cobalt III ions by liquid-liquid extraction where ammoniacal ammonium carbonate solutions are the only aqueous phases involved in the process. The process includes the successive steps of: (a) oxidizing the majority of any cobalt II ammines in the ammoniacal liquid to cobalt III; (b) extracting nickel from the ammoniacal liquor with an organic reagent, which reagent may also contain a suitable modifying reagent, to form a nickel loaded organic phase and an ammoniacal ammonium carbonate phase containing cobalt; (c) stripping the nickel loaded organic phase characterized by contacting the organic phase with an ammoniacal ammonium carbonate solution to form a nickel loaded aqueous strip liquor.

22 Claims, 1 Drawing Sheet

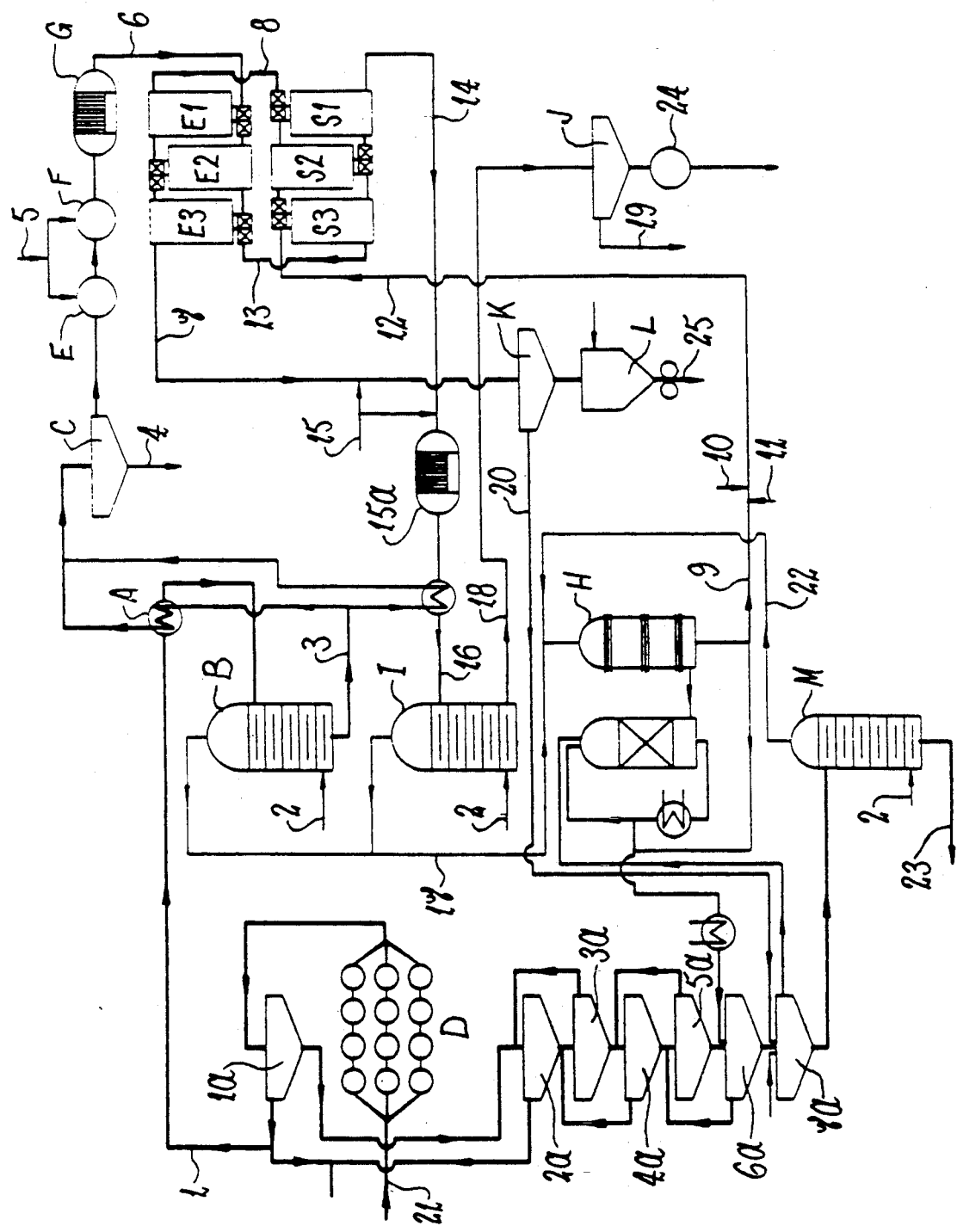

SEPARATION AND RECOVERY OF NICKEL AND COBALT IN AMMONIACAL SYSTEMS

The invention relates to a novel process for the separation and recovery of nickel and cobalt. More specifically, it relates to the separation and recovery of nickel and cobalt values when present in aqueous ammoniacal solution by solvent extraction and the recovery of the isolated nickel by aqueous ammonium carbonate stripping of the nickel-organic reagent complex.

Nickel and cobalt are valuable metals and their recovery from ores containing these metals is the basis of widespread Industrial Processes of considerable importance. A common process for the recovery of nickel and cobalt from ores and concentrates is to use a reduction roast followed by an ammonia-ammonium carbonate leach process.

In such processes it is desirable to produce a basic nickel carbonate to allow for further processing. In order to produce a basic nickel carbonate of suitable purity, it is necessary to first remove the associated dissolved cobalt.

This is normally achieved by injection of a suitable sulphiding agent, for example, gaseous hydrogen sulphide or ammonium hydrosulphide solution. This procedure results in some dissolved cobalt remaining in solution as well as the removal of some dissolved nickel, both of which are undesirable.

In addition, the mixed nickel-cobalt sulphide formed, and other metal impurities that are concurrently precipitated, have to be subjected to a complex series of digestion, separation and recovery processes before metallic cobalt and metallic nickel, or suitable salts thereof, can be obtained.

The sulphiding process also introduces sulphur anions into the essentially cobalt-free nickel-rich process stream. The sulphur anions are difficult to remove and contaminate the basic nickel carbonate when it is precipitated. The presence of sulphur compounds in the basic nickel carbonate requires high calcination temperatures to produce a suitable low sulphur content nickel oxide product.

Liquid-liquid extraction processes are now well established in processing a wide range of metallic and non-metallic compounds. The application of such a process to the present problem avoids the use of a sulphiding compound, but it is often difficult to achieve the desired result.

In particular, nickel-cobalt separation by liquid-liquid extraction is relatively difficult but can be effected under certain conditions, for example, a suitable extraction can be achieved by contacting the organic reagent tri-iso-octylamine with a strongly acidic chloride solution of nickel and cobalt in oxidation state II. Another example of the extraction is the application of di-2-ethylhexyl phosphoric acid or similar reagents, such as bis-(2,4,4-trimethylpentyl) phosphonic acid and 2-ethylhexyl phosphonic acid mono-2-ethylhexyl ester to acidic sulphate solutions containing nickel and cobalt in oxidation state II.

Further examples of the extraction step involve the application of oxime type reagents such as 2-hydroxy-5-t-nonyl acetophenone oxime and 2-hydroxy-5-dodecyl benzophenoneoxime to ammoniacal ammonium sulphate or carbonate solutions of nickel and cobalt, the latter in oxidation state III. An additional example of another type of reagent is the contacting of substituted beta-diketone reagents with ammoniacal ammonium carbonate or sulphate solutions of nickel and cobalt in oxidation state III.

During liquid-liquid extraction of nickel and cobalt using organic solvents the aqueous phase that separates from the organic phase is usually termed the raffinate and contains the majority of the cobalt, while the organic phase contains the majority of the nickel. In order to recover the nickel, the nickel-rich organic phase is reacted (stripped) with a suitable aqueous acid, for example sulphuric acid, to return the nickel to an aqueous phase, the resulting aqueous solutions are fed to conventional metal winning circuits, e.g. electrowinning, to recover nickel and the cobalt.

Acid stripping of the nickel-containing organic layer should be avoided if a basic nickel carbonate product is required. Prior to the present invention, a suitable non-acidic stripping medium capable of stripping nickel from commonly used organic reagents, such as 2-hydroxy-5-t-nonyl acetophenoneoxime, 2-hydroxy-5-nonyl salicylaldoxime and alkyl, aryl, halide substituted beta-diketone type reagents has not been developed.

The process of the present invention helps to alleviate the above-mentioned disadvantages of the prior art. It is an object of the present invention to provide a suitable stripping agent for the organic layer that is non-acidic, eliminates contamination of the nickel by sulphur anions, and Can be readily incorporated into an ammoniacal process stream containing nickel and cobalt.

Accordingly, the present invention resides in a process for the separation and recovery of nickel from an ammoniacal ammonium carbonate liquor containing nickel II ions and cobalt III ions by liquid-liquid extraction including the successive steps of:

(a) oxidising the majority of any cobalt II ammines in the ammoniacal liquor to cobalt III;

(b) extracting nickel from the ammoniacal liquor with an organic reagent to form a nickel loaded organic phase and an ammoniacal ammonium carbonate phase containing cobalt; and (c) stripping the nickel loaded organic phase; characterised in that the nickel loaded organic phase is stripped by contacting the organic phase with an ammoniacal ammonium carbonate solution to form a nickel loaded aqueous strip liquor and in that ammoniacal ammonium carbonate solutions are the only aqueous phases involved in the process.

This process may be applicable to the separation of a wide range of metallic or non-metallic compounds. The process is particularly useful, however, for the separation of nickel and cobalt. More specifically, the process of this invention is particularly useful for separating nickel in oxidation state II and cobalt in oxidation state III. Other separations to which the present process may be applied include the separation of copper and cobalt or of nickel and copper. However, for convenience of description and understanding, the following description will concentrate on the separation of nickel and cobalt.

The ammoniacal ammonium carbonate liquor containing the metal and cobalt may be heated prior to the oxidising step so as to precipitate unwanted elements and to reduce the ammonium content. It is preferred that the ammoniacal ammonium carbonate liquor be heated to a temperature of about 100° C. at atmospheric pressure and the ammonium content reduced to between 22 to 32 $gl^{-1}$. It is most preferred that the ammonia content is reduced to 25gl$^{-1}$ and the carbon dioxide content is 18gl$^{-1}$.

The process of the present invention involves a novel stripping agent to strip a nickel-loaded organic phase, obtained after a liquid-liquid extraction of the nickel and cobalt. The process is particularly applicable to liquid-liquid extraction processes where aqueous ammoniacal ammonium carbonate solutions have been used to dissolve the metals out of the ores, while the preferred type of organic reagents used include acetophenoneoximes, salicylaldoximes, and beta-diketones. The organic reagents together with suitable modifiers, if required, for example isotridecanol, may be dissolved in hydrocarbon solvents of either an aromatic or aliphatic nature. Other organic reagents may be used which preferentially extract nickel from aqueous solutions containing both nickel and cobalt but those named are currently commerically available and have been found particularly effective.

A particularly preferred organic solution may comprise about 32.5% v/v 2-hydroxy-5-nonylacetophenoneoxime, 18.4% v/v iso-tridecylalcohol with 49.1% v/v hydrocarbon solvent of less then 25% aromatic content. The preference for these quantities are based upon the specific ratios between the oxime solution and the specific alcohol The process is preferably applied to solutions in which the concentration of nickel is within the range of 8-10 gl$^{-1}$. A nickel concentration of about 9 gl$^{-1}$ appears to give optimum results, however adjustments to the circuit flow rates will compensate for both higher and lower nickel concentrations. The concentration of cobalt may vary widely in the solutions requiring separation without appearing to affect the efficiency of the separation.

The majority of the nickel will usually separate into the organic phase in which it will form a neutral nickel II organo-metallic complex with an organic/nickel molar ratio of 2. Cobalt III does not react with the organic reagents but cobalt II forms similar organo-metallic complexes to nickel II.

It is preferred that the ammoniacal liquor is contacted with the liquid organic solution containing the organic reagent for a period of between 30 seconds to 60 minutes. Most preferably the content time is for a period of about 3 minutes.

The majority of the cobalt, which is present as cobalt III, remains in the aqueous phase (raffinate). The cobalt in the raffinate may be recovered in any appropriate manner, for example by sulphiding.

Any nickel remaining in the raffinate can be recovered by appropriate procedures if such recovery is considered economically viable or is otherwise necessary.

The organic phase from the extraction step is then treated in order to recover the nickel. In order to achieve a desirable medium for the production of a basic nickel carbonate, the process of this invention involves contacting the nickel-containing organic phase with an aqueous ammoniacal ammonium solution, so as to recover the nickel by bringing it back into an aqueous solution.

The ammoniacal ammonium carbonate solution may contain excess ammonia and is preferably stronger than the ammoniacal ammonium carbonate solution used to leach the ore. The concentration of the solution used to recover the nickel from the loaded organic phase is preferably in the ranges of NH$_3$:210-300 gl$^{-1}$, CO$_2$:1-50-250 gl$^{-1}$. The solution strength currently most preferred is NH$_3$:270 gl$^{-1}$, CO$_2$:230 gl$^{-1}$.

The contact between the loaded organic phase the ammoniacal ammonium carbonate solution may be carried out at any appropriate temperature and pressure. Preferably this step is conducted at atmospheric pressure and at a temperature in the range of 20° C. to 50° C.

It is preferred that the nickel loaded organic phase is contacted with the ammoniacal ammonium carbonate solution for a period of between 30 seconds to 60 minutes. Most preferably the content time is for a period of about 3 minutes.

Both the separation and stripping process can be carried out by a conventional batch extraction technique or by a continuous mixer settler technique. The latter technique is generally preferred as it recycles the stripped organic phase in a continuous manner, thus allowing the one volume of organic reagent to be repeatedly used for nickel recovery.

When the process of the invention is applied to the operation of a continuous counter current mixer-settler apparatus, the organic/aqueous ratio in the stripping cells is preferably in the range of 6.0-10.0:1. This contrasts with the preferred organic/aqueous range in the extraction cells (where comparable organic agents may be used) of 1.0-1.2:1.

It is preferred that the nickel loaded organic phase is stripped in a stripping cell at a temperature of about 40° C.

The nickel that separates into the aqueous phase can be recovered as a nickel carbonate by any conventional manner. For example, basic nickel carbonate can readily be recovered by distillation. Nickel can also be recovered effectively from aqueous ammonium carbonate solution by hydrogen reduction under pressure. The recovery technique preferably allows for the NH$_3$ and CO$_2$ components of the strip liquor to be recycled to the nickel loaded organic stripping stage.

The process of the present invention is illustrated with reference to the following examples. It is to be understood that these examples are given by way of illustration only and are not to be construed as limiting the scope of the invention as broadly described.

In all of the following examples 1 to 4, the liquors tested were obtained from currently operating process stream and had the following initial approximate compositions:

| | |
|---|---|
| Nickel | 10.0 gl$^{-1}$ |
| Cobalt | 0.46 gl$^{-1}$ |
| NH$_3$ | 85 gl$^{-1}$ |
| CO$_2$ | 62 gl$^{-1}$ |

Prior to liquid-liquid extraction, this liquor was treated to lower the total ammonium content to a suitable strength of approximately 30 gl$^{-1}$.

EXAMPLE NO. 1

The organic extractant system consisted of 25 volumes of a (2-hydroxy-5-t-nonyl acetophenoneoxime) reagent dissolved in 75 volumes of kerosene of approximately 17% aromatic content. Test work was carried out in the temperature range of 23° C. to 43° C. The mixer settlers used were sealed units to prevent loss of NH$_3$ and CO$_2$ to the atmosphere.

The batch extraction tests were conducted in the approximate ratio range of organic phase to aqueous phase of 10:1 to 1:10 in seven ratio increments. For the continuous mixer/settler tests the organic to aqueous ratio of 1.64 was used.

Typical results for the batchwise loading tests are given in Table No. 1 and the continuous mixer/settler test results are given in Table No. 2.

TABLE NO. 1

Feed liquor composition: Ni 14.4 gl$^{-1}$, Co 0.48 gl$^{-1}$

| (Approx.) ORGANIC/AQUEOUS PHASE RATIO | AQUEOUS PHASE | | ORGANIC PHASE | |
|---|---|---|---|---|
| | Ni | Co | Ni | Co |
| 10:1 | 0.010 | 0.48 | 1.26 | 0.001 |
| 5:1 | 0.003 | 0.48 | 2.70 | 0.001 |
| 2:1 | 0.003 | 0.48 | 6.20 | 0.001 |
| 1:1 | 0.010 | 0.48 | 12.8 | 0.001 |
| 1:2 | 4.3 | 0.48 | 17.6 | 0.001 |
| 1:5 | 5.9 | 0.48 | 17.6 | 0.001 |
| 1:10 | 12.1 | 0.48 | 17.8 | 0.001 |

All results in gl$^{-1}$.

TABLE NO. 2

Feed liquor composition: Ni 12.5 gl$^{-1}$, Co 0.64 gl$^{-1}$

| EXT CELL 1 | EXT CELL 2 | (Raffinate) EXT CELL 3 | NICKEL LOADED ORGANIC |
|---|---|---|---|
| 490 PPm Ni | 5 PPm Ni | 0.7 ppm Ni | 8.48 gl$^{-1}$ |

The batch stripping tests were conducted in the range of organic to aqueous of approximately 10:1 to 1:10 in seven ratio increments. The stripping solution was an ammoniacal ammonium carbonate solution. Typical results for the batch stripping tests are given in Table No. 3.

For the continuous mixer settler stripping test, the O/A ratio of 1.66 was used and the results are given in Table No. 4.

TABLE NO. 3

Loaded organic phase: 18.0 gl$^{-1}$ Ni

| ORGANIC/AQUEOUS APPROX. PHASE RATIO | Ni gl$^{-1}$ | |
|---|---|---|
| | AQUEOUS PHASE | ORGANIC PHASE |
| 10:1 | 23.2 | 15.4 |
| 5:1 | 16.0 | 14.0 |
| 2:1 | 13.4 | 11.4 |
| 1:1 | 7.7 | 8.6 |
| 1:2 | 6.2 | 5.2 |
| 1:5 | 2.6 | 4.4 |
| 1:10 | 1.4 | 4.2 |

TABLE NO. 4

Loaded organic phase: 8.16 gl$^{-1}$ Nickel (All results gl$^{-1}$ Ni)

| STRIP CELL 1 | STRIP CELL 2 | STRIP CELL 3 | STRIP CELL 4 | STRIPPED ORGANIC |
|---|---|---|---|---|
| (Loaded Strip Liquor) | | | | |
| 12.3 | 6.4 | 3.5 | 1.6 | 1.42 |

The data in Tables 1, 2, 3 and 4 clearly demonstrate the selectivity of extraction and the efficiency of the discovered stripping media. The resultant raffinate rich in cobaltic cobalt and loaded strip liquor rich in nickel are suitable for downstream treatment to recover high purity cobalt and nickel materials respectively.

EXAMPLE NO. 2

The organic extraction system in this case consisted of 25 volumes of a 2-hydroxyl-5-nonyl-salicylaldoxime reagent dissolved in 75 volumes of kerosene of approximately 17% aromatic content. Apparatus and conditions employed were similar to those described above in Example No. 1. Typical results for the batchwise extraction tests are given in Table No. 5 and the continuous mixer settler extraction test results are given in Table No. 6.

TABLE NO. 5

Feed liquor composition: Ni 13.0 gl$^{-1}$, Co 0.42 gl$^{-1}$

| (Approx.) ORGANIC/AQUEOUS PHASE RATIO | AQUEOUS PHASE | | ORGANIC PHASE | |
|---|---|---|---|---|
| | Ni gl$^{-1}$ | Co gl$^{-1}$ | Ni gl$^{-1}$ | Co gl$^{-1}$ |
| 10:1 | 0.004 | 0.42 | 1.3 | 0.001 |
| 5:1 | 0.016 | 0.42 | 2.5 | 0.001 |
| 2:1 | 0.008 | 0.42 | 6.08 | 0.001 |
| 1:1 | 0.071 | 0.42 | 11.36 | 0.001 |
| 1:2 | 6.04 | 0.42 | 11.92 | 0.001 |
| 1:5 | 10.28 | 0.42 | 12.18 | 0.001 |
| 1:10 | 11.52 | 0.42 | 12.18 | 0.001 |

TABLE NO. 6

Feed liquor composition: Ni 12.36 gl$^{-1}$, Co 0.62 gl$^{-1}$

| EXT CELL 1 | EXT CELL 2 | (Raffinate) EXT CELL 3 | NICKEL LOADED ORGANIC |
|---|---|---|---|
| 195 ppm Ni | 1.5 ppm Ni | 1.0 ppm Ni | 10.76 gl$^{-1}$ Ni |

The batch stripping tests were conducted in approximate ratios ranging from 10:1 to 1:10 organic to aqueous in seven ratio increments. The stripping solution was an ammoniacal ammonium carbonate solution. The results from the continuous mixer settler stripping test at an organic to aqueous ratio of 1.6 are given in Table No. 8.

TABLE NO. 7

Loaded organic phase: 12.4 gl$^{-1}$ Ni

| ORGANIC/AQUEOUS APPROX. PHASE RATIO | Ni gl$^{-1}$ | |
|---|---|---|
| | AQUEOUS PHASE | ORGANIC PHASE |
| 10:1 | 18.6 | 11.0 |
| 5:1 | 16.1 | 9.2 |
| 2:1 | 10.0 | 7.4 |
| 1:1 | 7.0 | 5.8 |
| 1:2 | 3.6 | 5.0 |
| 1:5 | 1.4 | 4.4 |
| 1:10 | 0.66 | 4.2 |

TABLE NO. 8

Loaded organic phase: 11.1 gl$^{-1}$ Ni (All results gl$^{-1}$ Ni)

| STRIP CELL 1 | STRIP CELL 2 | STRIP CELL 3 | STRIP CELL 4 | STRIPPED ORGANIC |
|---|---|---|---|---|
| (Loaded Strip Liquor) | | | | |
| 14.1 | 6.7 | 3.2 | 1.7 | 2.72 |

The data in Tables 5, 6, 7 and 8 clearly demonstrate the selectivity of extraction and the efficiency of the discovered stripping media. The resultant raffinate rich in cobaltic cobalt and the loaded strip liquor rich in nickel are suitable for downstream treatment to recover high purity cobalt and nickel materials respectively.

EXAMPLE NO. 3

The organic extraction system in this case consisted of 25 volumes of an alkyl, aryl substituted beta-diketone reagent, dissolved in 75 volumes of kerosene with greater than 50% aromatic content. Apparatus and conditions employed were similar to those reported above in Example No. 1. Typical examples for the batchwise extraction tests are given in Table No. 9 and the continuous mixer settler test results are given in Table No. 10.

TABLE NO. 9

Feed liquor composition:
Nickel 12.9 gl$^{-1}$, Cobalt 0.56 gl$^{-1}$

| (Approx.) ORGANIC/AQUEOUS PHASE RATIO | AQUEOUS PHASE | | ORGANIC PHASE | |
|---|---|---|---|---|
| | Ni gl$^{-1}$ | Co gl$^{-1}$ | Ni gl$^{-1}$ | Co gl$^{-1}$ |
| 10:1 | 0.44 | 0.56 | 1.16 | 0.001 |
| 5:1 | 0.64 | 0.56 | 2.34 | 0.001 |
| 2:1 | 2.0 | 0.56 | 5.48 | 0.001 |
| 1:1 | 5.2 | 0.56 | 7.48 | 0.001 |
| 1:2 | 8.6 | 0.56 | 8.08 | 0.001 |
| 1:5 | 11.2 | 0.56 | 8.98 | 0.001 |
| 1:10 | 11.8 | 0.56 | 9.0 | 0.001 |

TABLE NO. 10

Feed liquor composition: Ni 12.36 gl$^{-1}$, Co 0.57 gl$^{-1}$

| EXT CELL 1 | EXT CELL 2 | EXT CELL 3 | (Raffinate) EXT CELL 4 | NICKEL LOADED ORGANIC |
|---|---|---|---|---|
| 5.64 | 1.46 | 0.27 | 0.069 | 6.34 |

The batch striping tests were conducted in approximate ratios ranging from 10:1 to 1:10 organic to aqueous in seven ratio increments. The stripping solution was an ammoniacal ammonium carbonate solution. Typical results for the batch stripping tests are given in Table No. 11.

The results from the continuous mixer settler test at an organic to aqueous ratio of 4.9 are given in Table No. 12.

TABLE NO. 11

Loaded organic phase: 9.5 gl$^{-1}$ Ni

| ORGANIC/AQUEOUS APPROX PHASE RATIO | AQUEOUS PHASE Ni gl$^{-1}$ | ORGANIC PHASE |
|---|---|---|
| 10:1 | 28.3 | 6.0 |
| 5:1 | 26.6 | 2.7 |
| 2:1 | 14.6 | 0.14 |
| 1:1 | 8.0 | 0.05 |
| 1:2 | 4.0 | 0.01 |
| 1:5 | 1.8 | 0.01 |
| 1:10 | 0.9 | 0.01 |

TABLE NO. 12

Loaded organic phase

| STRIP CELL 1 | STRIP CELL 2 | STRIP CELL 3 | STRIPPED ORGANIC |
|---|---|---|---|
| (Loaded Strip Liquor) | | | |
| 28.2 gl$^{-1}$ | 2.2 gl$^{-1}$ | 0.036 gl$^{-1}$ | 2 ppm Ni |

It will be noticed from these last two tables that the discovered stripping liquor is extremely effective in recovering the nickel from the loaded organic phase.

The separation and recovery of nickel and cobalt in oxidation state III in completely ammoniacal systems is not restricted to ammoniacal ammonium carbonate leachates of reduced laterities. Other ammonia-ammonium salt solutions in which cobalt is in oxidation state III can be successfully treated by the present invention. Aeration or oxidation of the ammonia-ammonium salt solution by other oxidants is a preferred method of bringing the dissolved cobalt into oxidation state III. For example, as will be shown by the following example, the method is applicable to solutions resulting from the oxidation under Pressure of nickel cobalt sulphides producing nickel ammines and cobaltic (Co III) ammines in ammoniacal solutions.

EXAMPLE NO. 4

The solution of nickel and cobalt was prepared by autoclaving a plant produced nickel cobalt sulphide solid sample slurried at 15% solids W/V in ammonium carbonate solutions (NH$_3$ 160, CO$_2$ 100 gl$^{-1}$) at 70° C. for three hours at oxygen pressure 45 psig. The resultant solution has the following composition.

| Ni | 32.4 gl$^{-1}$ |
|---|---|
| Co | 14.0 gl$^{-1}$ |
| NH$_3$ | 80 gl$^{-1}$ |
| CO$_2$ | 64 gl$^{-1}$ |

The organic extractant system used in this case in a bench shake-out test was a 2-hydroxyl-5-nonyl acetophenoneoxime reagent (47% V/V) in kerosene. The apparatus and conditions used in the bench shake-out tests were similar to those reported above for Example No. 1. The results for the batchwise tests are given in Table No. 13.

TABLE NO. 13

| (Approx.) ORGANIC/AQUEOUS PHASE RATIO | AQUEOUS PHASE | | ORGANIC PHASE | |
|---|---|---|---|---|
| | Ni | Co | Ni | Co |
| 10:1 | 0.012 | 14.0 | 3.2 | 0.001 |
| 5:1 | 0.056 | 14.0 | 7.2 | 0.001 |
| 2:1 | 5.9 | 14.0 | 13.2 | 0.001 |
| 1:1 | 18.0 | 14.0 | 14.0 | 0.001 |
| 1:2 | 24.6 | 14.0 | 14.0 | 0.001 |
| 1:5 | 28.2 | 14.0 | 14.0 | 0.001 |
| 1:10 | 30.6 | 14.0 | 14.0 | 0.001 |

All results in gl$^{-1}$.

EXAMPLE NO. 5

A counter current liquid ion exchange circuit consisting of three extraction cells, three stripping cells and one loaded organic wash cell is fed with an ammonium carbonate solution (25 gl$^{-1}$ NH$_3$, 14 gl$^{-1}$ CO$_2$) with 9 gl$^{-1}$ Ni and variable cobalt, 0.1 to 1.0 gl$^{-1}$ together with trace amounts of iron, manganese, copper and zinc.

The organic extractant used is a 42.5% V/V solution of an alkyl, aryl, beta-diketone dissolved in the high aromatic content solvent Pegasol R150 sold by Mobil.

In the extraction stages the organic to aqueous ratio was 1 0:1.

The aqueous raffinate (cobalt III rich solutions) analysed 0.34 gl$^{-1}$ cobalt, 0.005 gl$^{-1}$ nickel, averaged over a 24 hour continuous period.

The strip liquor feed solution Contained 240 gl$^{-1}$ NH$_3$ and 215 gl$^{-1}$ CO$_2$ and contacted the nickel loaded organic reagent exiting extractant cell No. 1 in an organic to aqueous ratio of 7.5:1. The ratio of the organic to aqueous phases in the mixer box was maintained at 1:1 or thereabouts as necessary, by the use of aqueous recycle from the settler back to the mixer in each individual cell.

The loaded strip solution analysed 68.6 gl$^{-1}$ nickel and 0.013 gl$^{-1}$ cobalt averaged over a 24 hour period.

The stripped organic solution after exiting the final strip cell (S3) and before entering the final extraction cell (E3) analysed 0.10 gl$^{-1}$ nickel and 0.006 gl$^{-1}$ cobalt.

The system was operated continuously for 96 hours at 30-40° C. with the stripped organic recycled from the stripping to the extraction cells via a small volume intermediate vessel. The results reported above were typical of those achieved during the operating An alternative organic extractant for use in the above process is a 27.5% V/V solution of a modified hydroxy oxime reagent. An alternative high azomatic content solvent is Solvesso 150 sold by Exxon. The organic to aqueous ratio in the extraction stages may be increased to 1.2:1 and the continuity of the phases may be either aqueous continuous or organic continuous depending on which system produces the least organic reagent entrainment losses.

The aforementioned description outlines the process as performed in a laboratory environment. The adaptation of this process into a pilot plant is outlined in the following description by reference to FIG. I and the following specific example. It should be understood that the drawinq and specific example are only illustrative and not intended to be limitinq to the scope of the invention.

While the Pilot Plant was designed to process forty five (45) liters per minute of plant liquor it must be emphasized that by extrapolating the results found for the Pilot Plant one skilled in the art can design a commercial Plant for processing large volumes of solution.

The operations performed in the Pilot Plant can be itemised as follows:
1. Solution Preparation
2. Solvent Extraction
3. Metal Stripping
4. Loaded Strip Liquor purification
5. Steam Stripping
6. Nickel Recovery
7. Cobalt Recovery.

SOLUTION PREPARATION

Ores containing cobalt and nickel values are prepared by forming an appropriate slurry. This preparation includes reducing the metal ores in size by crushing and grinding and chemically reducing by subjecting the ores to suitable reductants while also heating.

The resultant slurry (21) is passed through aeration tanks (D) oxidising the majority of any cobalt II to cobalt III. The slurry is then subjected to washing and thickening in tanks 1a to 7a. Tailings (23) are removed after washing through tailings still (M) wherein steam (2) is added and vapours (22) are condensed in Gas Cooler condenser (H). Any non condensed vapours are passed to absorber (N) for dissolution in plant liquor and the resultant liquid recycled back to wash thickener 7(a).

The Plant Product Liquor solution stream (1) of normal composition (9 gl$^{-1}$ Ni, 0.4 gl$^{-1}$ Co, 85 gl$^{-1}$ NH$_3$ and 60 gl$^{-1}$ CO$_2$) is pumped through a heat exchanger (A) to a multiple tray distillation column (B). Steam from a 10 psi line (2) is injected into the bottom of the Still thereby stripping some ammonia and carbon dioxide from the Plant Product Liquor. The amount of steam applied is carefully controlled to produce a liquor containing approximately 25 gl$^{-1}$ ammonia (NH$_3$) 18 gl$^{-1}$ carbon dioxide CO$_2$ with essentially the same concentration of nickel and cobalt as the incoming Product Liquor. This quantity of steam is of the order of 0.12 kg steam per liter of Product Liquor feed. This liquor exiting the distillation column is termed special product liquor and is identified as stream (3) and has the following approximate composition.

TABLE NO. 14

| Nickel | 7.3 g/l | Ammonia | 28 g/l |
|---|---|---|---|
| Cobalt | 0.35 g/l | Carbon Dioxide | 18 g/l |
| Iron | 1 ppm | Zinc | 7 ppm |
| Manganese | 1 ppm | Copper | 15 ppm |
| Magnesium | 22 ppm | | |

The distillation procedure described above produces two essential benefits to the process stream prior to solvent extraction; (i) the reduced ammonia concentration significantly enhances the solvent extraction kinetics thereby reducing both the size of the solvent extraction cells and their number; (ii) the effect of heat on the Product Liquor stream causes coagulation and precipitation of important impurity elements such as iron, manganese, silica and arsenic together with the removal of other impurities such as organic polymer flocculants.

The removal of the above impurities greatly enhances the efficiency of the solvent extraction process and eliminates the formation of "crud" in the settling section of the solvent extraction cells. The absence of a "crud" phase allows the solvent extraction cells to be operated continuously.

The removal of these impurity solids is effected by passing the special product liquor stream (3) to a Thickener, vessel (C). The underflow slurry (4) from this vessel contains the impurity elements listed above together with some nickel and this is returned to the plant stockpile to enable the nickel to be recovered.

The solvent extraction nickel cobalt separation efficiency depends largely on the presence of cobalt III compounds and absence of cobalt II compounds in the special Product liquor stream (3). The presence of cobalt II compounds in the special product liquor stream can be caused by factors such as insufficient aeration of the ore/liquor slurry during leaching of the reduced ore in the Aeration and Leaching Banks (D) and or post leaching conversion of Co III compounds to Co II compounds by reducing substances in either the product liquor or special product liquor.

Irrespective of the mode of formation of cobalt II in special product liquor it is essential that the element be reoxidised to oxidation state III prior to solvent extraction.

The reoxidation of cobalt II to cobalt III is essential for two main reasons: (i) cobalt II is extracted together with nickel II by the organic reagent and subsequent stripping of the organic reagent with ammonia-ammonium carbonate solution to recover nickel may also remove the cobalt II thereby contaminating the essentially pure nickel solution and resulting in a loss of some cobalt; (ii) The cobalt II organic reagent complex can undergo oxidation within the solvent extraction cells in which case the cobalt cannot be stripped from the organic reagent by normal procedures. The accumulation of cobalt II and III on the organic phase, as must occur over an extended period of operation, results eventually in the nickel extracting power of the reagent being reduced.

The reagent has not been permanently lost as special techniques have been developed by the inventor to treat the reagent and remove the cobalt thus restoring the reagent to its full nickel loading capacity, but this entails additional costs.

In order to reduce the concentration of cobalt II compounds present in special product liquor to a minimum prior to solvent extraction the cooled special product liquor is passed through storage tanks (E, F) in which the liquor is continuously aerated by the injection of air through sintered stainless steel tubes (5).

Provided the size of the tanks is correctly gauged to allow adequate retention time for the oxygen in the air to oxidise the cobalt II compounds to cobalt III compounds the exiting liquor will contain less than five parts per million cobalt II.

It is desirable to reduce this cobalt II level even further since in doing so the volume of organic reagent that has to be specially treated to strip the cobalt from the organic reagent is greatly reduced thus saving additional treatment costs.

It has been found that the addition of hydrogen peroxide to special product liquor provides the additional oxidising power necessary to lower the cobalt II concentration to one part per million or less in the special product liquor. Hydrogen peroxide is added to the aerated special product liquor prior to the liquor being pumped into a diatomaceous earth filter (G) to remove any fine suspended solids.

The effluent from the filter system (G) is now ready for the solvent extraction separation of nickel and cobalt. The filtration procedure completes the solution preparation phase.

SOLVENT EXTRACTION

In this section of the Pilot Plant the object is to use an organic reagent mixture in hydrocarbon solvent to separate nickel and cobalt and recover the nickel in an ammonium carbonate strip liquor thereby allowing the organic reagent mixture to be continually recycled for further nickel loading duties.

A number of organic reagent mixtures can be used giving satisfactory results, however this Pilot Plant description covers the use of a mixture of 2-hydroxy-5-t-nonylacetophenone oxime, isotridecanol and aliphatic kerosene, the proportions being adjusted to yield optimum stripping and extraction properties.

The special product liquor stream (6) is pumped at the rate of 35 liters/minute into the mixer box of extraction cell E1 where it contacts the partially nickel loaded organic reagent exiting extraction cell E2 and also flowing at a rate of 35 liters/minute. The mixed phases overflow the mixer box and separate in the settler section of the solvent extraction Cell, the organic phase rising to the top of the aqueous, heavy phase underneath. The phases flow cocurrently in the cells but countercurrently between the cells. The process of mixing and separation is repeated in each cell with the aqueous phase (7) exiting extraction cell E3 being essentially free of nickel while the organic phase (8) exiting extraction cell E1 being free of cobalt and loaded with nickel.

As it is standard practice and is known to those skilled in the art of solvent extraction, provision has been made in the design of the extraction cells to allow some of the aqueous phase in each cell to be recycled back to the mixer box. This is an important facility as it allows for the use of a ratio of organic/aqueous in excess of 1.0 overall in the circuit while maintaining a ratio of 1.0 in the mixer boxes. The ratio of 1.0 organic to aqueous in the mixer is desirable as it facilitates the mixing and metal transfer properties of the phases.

METAL STRIPPING

It is well known to those experienced in the art of metal recovery from ores using ammonia-ammonium carbonate leach solutions that both ammonia and carbon dioxide can be recovered from solutions thereof by steam distillation. The resulting solutions of ammonia and carbon dioxide obtained by condensing the vapours from such distillation procedures may require modification before being used as stripping reagents in the solvent extraction process.

The composition of the ammonia-ammonium carbonate stripping solution is a vital factor in controlling the efficiency of the solvent extraction overall process. The condensate (9) from the Gas Cooler Condensers (H) can be modified by the injection of anhydrous ammonia gas (10) or by injection of carbon dioxide gas (11) to achieve the desired result.

The resulting strip liquor of suitable composition (12) is pumped at approximately 4 liters per minute into the mixing box of strip cell S3 where it contacts both the partially stripped organic reagent mixture exiting strip cell S2 at 35 liters per minute and an amount of recycle aqueous phase from strip cell S3 equal to approximately 31 liters per minute. This combination of solution streams gives an organic to aqueous ratio in the mixer box of cell S3 of approximately 1:1, which is desirable for both mixing and metal transfer reasons.

As described above for the extraction cells the mixed phases overflow the S3 mixer box and separate in the settler section of the cell. The partially nickel loaded strip liquor moves forward to the mixer box of strip cell S2 where it contacts the partially stripped organic reagent mixture exiting strip cell S1. The stripped organic reagent mixture (13) exiting strip cell S3, now referred to as stripped organic gravitates to an intermediate reagent storage tank from which it is pumped to extraction cell E3 to recommence separating nickel from the incoming special product liquor stream (6).

The strip liquor exiting strip cell S2 enters the mixer box of strip cell S1 where it contacts both the incoming nickel loaded organic reagent exiting extraction cell E1 and a metered flow of recycle aqueous phase from the settler section of strip cell S1 to enable an organic to aqueous ratio of approximately 1:1 to be achieved.

The aqueous phase exiting the strip cell S1 is referred to as the loaded strip liquor (14) and may contain 80 $gl^{-1}$ nickel, 270 $gl^{-1}$ $NH_3$ and 230 $gl^{-1}$ $CO_2$ together with some impurity elements such as copper, cobalt and magnesium.

It will be noted by people with prior experience in solvent extraction and metal separation that the above description of the mixer settlers is general in nature and that other equipment is available that will produce essentially the same result. It is also important to control time and temperature of mixing and the method of pumping and mixing in order to maximise the rate and extent of metal transfer and minimise the extent of organic reagent loss by both entrainment and degradation.

It will also be known to those with prior knowledge of the art that the continuity of the phases can greatly influence phase separation and reagent losses by entrainment. The change from aqueous phase continuous to organic phase continuous can be readily implemented and evaluated.

It should be apparent to those skilled in the art that the efficiencies of both the extraction and the stripping process are intimately associated with both the organic reagent mixture and the strip liquor composition considered on a molar ratio basis.

The total nickel loading capacity of the organic reagent mixture will govern the organic to aqueous ratio flow rates. The nickel loading capacity must exceed the concentration of nickel in the special product liquor in order to remove all the nickel from this stream at an organic to aqueous flow ratio of 1:1. The composition of the organic reagent mixture must be controlled so that it will rapidly release the complexed nickel to the strip liquor when so contacted. As a result of many studies it has been found that a reagent mixture containing 27.5 to 35% V/V of 2-hydroxy-5-t-nonyl acetophenone oxime and 15.5 to 20% V/V iso-tridecanol modifier diluted to 100% with an aliphatic-aromatic kerosene is a suitable reagent mixture for both extraction and stripping.

The composition of the strip liquor is also extremely important as it must have suitable stripping power to remove nickel from the nickel organic reagent complex to a sufficiently low residual nickel value such that the stripped organic reagent nickel loading Capacity is in excess of the nickel in the incoming special product liquor stream. As a result of many studies it has been found that a suitable strip liquor will have an ammonia content of 250-280 grams per liter and a carbon dioxide content of 220-250 grams per liter.

Typical equilibrium data for both the extraction and stripping circuits is presented in Table No. 15.

TABLE NO. 15

| OPERATING CONDITIONS | |
|---|---|
| Reagent: | 30% V/V 2-hydroxy-5-nonylacetophenone oxime |
| | 17% V/V isotridecylalcohol |
| | 53% V/V S2046 Kerosene |
| Three extraction cells - three strip cells | |
| Organic/Aqueous 1:1 on extract side | |
| Organic/Aqueous 9:1 on strip side | |
| Strip Liquor: $NH_3$ 266 gl$^{-1}$, $CO_2$ 220 gl$^{-1}$ | |
| Special Product Liquor: Ni 7.3 gl$^{-1}$, Co 0.35 gl$^{-1}$ | |

EXTRACTION EQUILIBRIUM

| CELL 1 | | CELL 2 | | CELL 3 | |
|---|---|---|---|---|---|
| Organic | Aqueous | Organic | Aqueous | Organic | Aqueous |
| Ni Co | Ni Co | Ni Co | Ni Co | Ni Co | Ni Co |
| *12.0 12 | 2.9 350 | 6.8 8 | 0.21 350 | 4.32 8 | 0.024 352 |

STRIPPING EQUILIBRIUM

| CELL 1 | | CELL 2 | | CELL 3 | |
|---|---|---|---|---|---|
| Organic | Aqueous | Organic | Aqueous | Organic | Aqueous |
| Ni Co | Ni Co | Ni Co | Ni Co | Ni Co | Ni Co |
| 10.4 8 | 88.6 6 | 8.4 8 | 76.8 1 | 3.7 4 | 51.0 1 |

*Ni values reported as gl$^{-1}$, cobalt values in ppm

The composition of the aqueous phase exiting Cell 1 of the stripping circuit illustrates the excellent ratio of nickel to cobalt achieved. From a Ni/Co of 20.9 in the Special Product Liquor the invention has enabled this to be upgraded to a Ni/Co ratio in excess of 14,000. A nickel product containing 99% nickel produced from this liquor would contain less than 0.007% cobalt as an impurity.

In the above example it will be noted that the emphasis has been placed on the composition of the loaded strip liquor stream (14) and the concentration of nickel therein. A feature of the invention is that it allows the concentration of the Loaded strip liquor stream (14) and the composition of the Raffinate stream (7) to be optimized.

The following example will illustrate how the nickel content of the Raffinate stream (7) can be reduced while maintaining the purity of the loaded strip liquor stream (14).

TABLE NO. 16

| OPERATING CONDITIONS | |
|---|---|
| Reagent: | 30% V/V 2-hydroxy-5-nonylacetophenone oxime |
| | 17% V/V isotridecylalcohol |
| | 53% V/V S2046 Kerosene |
| Three extraction cells - three strip cells | |
| Organic/Aqueous 1:1 on extract side | |
| Organic/Aqueous 8:1 on strip side | |
| Strip Liquor: $NH_3$ 285 gl$^{-1}$, $CO_2$ 260 gl$^{-1}$ | |
| Special Product Liquor: Ni 9.0 gl$^{-1}$, Co 0.38 gl$^{-1}$ | |

EXTRACTION EQUILIBRIUM

| CELL 1 | | CELL 2 | | CELL 3 | |
|---|---|---|---|---|---|
| Organic | Aqueous | Organic | Aqueous | Organic | Aqueous |
| Ni Co | Ni Co | Ni Co | Ni Co | Ni Co | Ni Co |
| *9.2 24 | 2.5 350 | 3.36 16 | 0.141 350 | 0.88 16 | 0.012 352 |

STRIPPING EQUILIBRIUM

| CELL 1 | | CELL 2 | | CELL 3 | |
|---|---|---|---|---|---|
| Organic | Aqueous | Organic | Aqueous | Organic | Aqueous |
| Ni Co | Ni Co | Ni Co | Ni Co | Ni Co | Ni Co |
| 7.2 24 | 74.2 2 | 3.28 16 | 48.0 1 | 0.72 16 | 17.4 1 |

*Ni values reported as gl$^{-1}$, cobalt values in ppm.

The results show that a nickel content in Raffinate of 12 ppm was achieved concurrently with a loaded strip liquor concentration of 74 gl$^{-1}$ nickel. It must also be evident that this nickel level in Raffinate could be lowered further if operating conditions allowed economical treatment of a loaded strip nickel of less than 74 gl$^{-1}$ nickel.

As will be immediately evident to those with prior knowledge of the art the above examples of solution composition represent but two of a number of possible combinations which will suit a particular situation and are given without the intention that the examples are the only ones possible.

. The loaded strip liquor (14) exiting strip cell S1 can now be treated if required to enhance the ratio of nickel to impurity elements.

LOADED STRIP LIQUOR PURIFICATION

The impurity elements such as manganese and iron are reduced to levels of the order or one part per million or less in the special product liquor by means of the ammonia distillation procedure described above. Metals such as copper that form stable ammines in ammonium carbonate solution will remain in solution during the distillation procedure and will, if present as cupric ions, extract into the organic reagent in a similar manner to nickel II and cobalt II.

It may be depending on the composition of the organic reagent mixture, that the copper distributes its concentration between the strip liquor and the organic reagent in a favourable fashion during stripping so that the nickel to copper ratio in the loaded strip liquor is satisfactory for specification purposes. On the other hand the copper may be stripped by the ammonia-ammonium carbonate strip liquor from its organic complex with similar facility to nickel and if present initially in the special product liquor at an unfavourable nickel to copper ratio the copper will have to be removed from the loaded strip liquor before a satisfactory nickel product can be produced.

Ammonium hydrosulphide is an effective sulphiding agent, particularly in ammoniacal solutions and there are many examples where it is used to precipitate metals from solution as insoluble sulphides. It is not a specific precipitating reagent but can nevertheless be used to sulphide one metal more favourably than another.

Injection of ammonium hydrosulphide (15) into a highly turbulent stream of loaded strip liquor (14) will result in the instant precipitation of a mixed sulphide of copper and nickel. If the ratio of nickel to copper in the loaded strip liquor is, for example, 700:1 then a mixed copper nickel sulphide of nickel to copper ratio of 0.5:1 can be recovered. Those with a knowledge of solubility product chemistry will appreciate why this is possible. No excess sulphur anions are introduced into the loaded strip liquor since all the sulpur anions will be removed with the precipitated mixed nickel copper sulphides.

The precipitated sulphides can be readily removed from solution by flocculation with organic polymers followed by filtration through a conventional industrial filter, such as copper sulphide filter 15($a$) to produce a purified loaded strip liquor (16).

STEAM STRIPPING

It is the purpose of this process to remove ammonia and carbon dioxide from the purified loaded strip liquor stream thereby destabilising the ammine complex of nickel resulting in precipitation of the nickel as a basic nickel carbonate of high purity. The purified loaded strip liquor stream (16) is pumped into a multiple plate distillation column (1) into the base of which is injected low pressure steam (2). The amount of steam necessary to effect complete precipitation of the nickel as basic nickel carbonate will vary with the nature of the purified loaded strip liquor stream, however a value of 0.6 kg steam per liter of feed liquor has been determined in trails.

The vapours from the distillation column (17) consisting essentially of water, ammonia and carbon dioxide are condensed in a Gas Cooler Condenser (H) and the condensate after concentration adjustment by the addition of either ammonia gas (10) or carbon dioxide gas (11) is termed strip liquor (12) and is recycled to strip cell S3 in the solvent extraction area.

The product stream from the distillation column consisting of a mixture of basic nickel carbonate and water of approximately 25% W/V solids is termed product magma (18) and is pumped to a Thickener (J) to increase the solids content of the slurry to approximately 50% W/V before further processing. Those familiar with handling suspensions of solids in aqueous streams will understand that organic flocculants may be added to the dilute slurry stream (18) to promote the production of a dense Thickener underflow product while at the same time producing an overflow stream almost free of suspended solids.

The clean aqueous overflow stream (19) may contain traces of ammonia of the order of 100 parts per million, soluble nickel of the order of 3 parts per million together with suspended basic nickel carbonate solids, that have not been collected by the flocculation process, of the order of 5 parts per million. This stream could be recycled directly to the plant as a source of good quality water, however as its temperature is above 50° C. it is first diverted to a cooling pond. The cooling pond serves a dual purpose in that while the aqueous phase is cooling below 50° C. it also allows any valuable suspended basic nickel carbonate solids to settle out for later recovery and recycle to the processing plant.

NICKEL RECOVERY

The nickel may be recovered as a basic nickel carbonate from stream (24) by any conventional manner.

The basic nickel carbonate solids produced are very pure, free of the anions of sulphur and have the general formula $NiCO_3.4Ni(OH)_2$. There are a number of ways in which the basic nickel carbonate may be processed to produce nickel products. Those experienced in metal production techniques will be aware that the basic nickel carbonate can be redissolved in ammonia-ammonium salt liquors and then subjected to high pressure hydrogen reduction to produce nickel metal of high purity. Alternatively the basic nickel carbonate can be calcined to produce both black and green nickel oxides which are also saleable products. The nickel oxides can be converted to nickel metal by reduction with hydrogen at moderate temperatures.

Basic nickel carbonate solids recovered from process streams containing sulphur anions at the time of distillation precipitation are always contaminated with sulphur compounds. The solids obtained from such a distillation precipitation are in fact a mixture of basic nickel carbonate and basic nickel sulphate. Processing these solids via the calcination-reduction route to produce a low sulphur nickel product requires temperatures in the oxidative calcination stage of the order of 1200° C.

A significant benefit of the present invention is that it eliminates sulphur anions prior to the distillation-precipitation recovery of basic nickel carbonate solids. Basic nickel carbonate solids recovered free of contaminating sulphur compounds can be converted to nickel oxide powder at temperatures in the range of 450–550° C. A substantial savings in energy accrues by processing at lower temperature.

This low temperature calcination facilitates the hydrogen reduction step which proceeds more rapidly with nickel oxide produced at a low temperature, consequently more energy savings are made or the same energy inputs will result in significantly higher productivity.

Commencing with basic nickel carbonate the route to nickel metal may proceed by initially heating the basic nickel carbonate in a Calciner at a suitably low temperature to produce black nickel oxide followed by reduction of the black nickel oxide in a heated hydrogen furnace to produce nickel metal.

Alternatively the conversion of the basic nickel carbonate to nickel oxide followed by reduction of the oxide metal may be achieved in one operation by careful control of the atmosphere and temperature of the reaction vessel. The offgas from the reaction vessel should have a carbon monoxide (CO) content of approximately 1.5% to achieve the required in-furnace reduction efficiency. The choice of fuel to produce both the heat and reducing atmosphere necessary is very important. The known ability of nickel oxide to react quickly with oxides of sulphur precludes the use of fuels containing sulphur if a low sulphur nickel metal is the desired end result.

A third Process is to commit the basic nickel carbonate directly to an electrically heated furnace through which a stream of hydrogen gas is passed. The decomposition of the basic nickel carbonate to nickel oxide is followed by reduction of the nickel oxide to nickel metal without any contamination of the metal by sulphur.

An example of such a product produced by the above process of heating in hydrogen gas is as follows:

TABLE 16

| Ni | Co | Fe | Mn | Mg | C | S | As | Zn | Cu |
|---|---|---|---|---|---|---|---|---|---|
| 99.30 | 0.04 | 0.13 | 0.02 | 0.12 | 0.02 | 0.005 | 0.0001 | 0.02 | 0.05 |

COBALT RECOVERY

The aqueous stream exiting the E3 extraction cell is called the Raffinate (7) and contains a mixture of cobalt ammines with cobalt in oxidation state (III).

Efficient operation of the solvent extraction process will control the level of nickel impurity in the raffinate and this has been found in the Pilot Plant to average 20 parts per million. With a cobalt concentration of, on average, 400 parts per million in the raffinate stream the nickel represents a significant impurity. The raffinate stream may also contain other impurities although these would be of a minor nature compared with nickel.

The present invention utilizes the efficiency of the hydrosulphide ion in precipitating insoluble metal sulphides from dilute solution. This procedure separates nickel and cobalt from elements such as magnesium that do not under these conditions form insoluble sulphides, releases the solution which contains approximately 25 grams per liter ammonia and 15 grams per liter carbon dioxide for recycling back to the process and serves to isolate the metals in a concentrated form.

The raffinate stream (7) is injected with ammonium hydrosulphide (15) at a ratio of approximately one part ammonium hydrosulphide liquor to 170 parts of raffinate. The reaction is carried out in a tube reactor in which the solutions are in a turbulent state. It is desirable to add sufficient ammonium hydrosulphide liquor to remove all of the cobalt from solution and at the same time allowing as much nickel as possible to remain in solution. Realization of this aim will result in extremely low levels of excess hydrosulphide ion in the sulphided raffinate.

The addition of organic flocculating agents to the sulphided liquor enables the sulphide solids to be concentrated in a Thickener (K) before the underflow of solids is dehydrated in a Spray Dryer (L) prior to further treatment or sale as a cobalt nickel sulphide product.

The clean liquid overflow from Thickener (K) will now be almost free of metals and have an ammonia and carbon dioxide content similar to the incoming Special Product Liquor stream. This liquor (20) is of a suitable composition to be returned to the ore leaching-washing circuit Thickener No. 7aorganic reagent selected from the group consisting of 2-hydroxy-5-t-nonyl acetophenoneoxime, 2-hydroxy-5-nonyl salicylaldoxime, alkyl, aryl and halide substituted beta diketones.

We claim:

1. A process for the separation and recovery of nickel from an ammoniacal ammonium carbonate liquor containing nickel II ions and cobalt III ions by liquid-liquid extraction including the successive steps of:
    (a) oxidising the majority of any cobalt II ammines in the ammoniacal liquor to cobalt III;
    (b) extracting nickel from the ammoniacal liquor with an organic reagent organic reagent selected from the group consisting of 2-hydroxy-5-t-nonyl acetophenoneoxime, 2-hydroxy-5-nonyl salicylaldoxime, alkyl, aryl and halide substituted beta diketones to form a nickel loaded organic phase and an ammoniacal ammonium carbonate phase containing cobalt; and
    (c) stripping the nickel loaded organic phase; characterised in that the nickel loaded organic phase is stripped by contacting the organic phase with an ammoniacal ammonium carbonate solution to form a nickel loaded aqueous strip liquor and in that ammoniacal ammonium carbonate solutions are the only aqueous phases involved in the process.

2. A process as claimed in claim 1, characterised in that the ammoniacal ammonium carbonate liquor containing the nickel and cobalt is heated prior to step (a) so as to precipitate impurities and reduce the ammonium content.

3. A process as claimed in claim 2, characterised in that the ammoniacal ammonium carbonate liquor is heated to a temperature of about 100° C. at atmospheric pressure and the ammonium content reduced to between 22 to 32 gl$^{-1}$ 4. A process as claimed in claim 3, characterised in that the ammoniacal ammonium carbonate liquor comprises ammonia and carbon dioxide the ammonia content is reduced to 25 gl$^{-1}$ and the carbon dioxide content is 18 gl$^{-1}$.

5. A process as claimed in claim 1, characterised in that the cobalt II ammines are oxidised to cobalt III by oxidising with air or air in combination with hydrogen peroxide.

6. A process as claimed in claim 5, characterised in that the ammoniacal liquor contains less than 1 ppm cobalt II after oxidation, at 50° C. and atmospheric pressure.

7. A process as claimed in claim 1 characterised in that the liquid organic solution also- contains a modifying reagent selected from the group consisting of an alcohol, an aliphatic or aromatic kerosene carrier and a combination of an alcohol with an aliphatic or aromatic kerosene carrier.

8. A process as claimed in claim 7, characterised in that the modifying reagent is an alcohol selected from iso-tridecylalcohol, iso-undecylalcohol, iso-dodecylalcohol and the corresponding linear types.

9. A process as claimed in claim 8, characterised in that the alcohol is iso-tridecylalcohol.

10. A process as claimed in claim 7, characterised in that the organic solution comprises 32.5% v/v 2-hydroxy-5-nonylaceto-phenoneoxime, 18.4% v/v isotridecylalcohol with 49.1% v/v hydrocarbon solvent of less than 25% aromatic content.

11. A process as claimed in claim 1, characterised in that the ammoniacal liquor is contacted with the liquid organic solution containing the organic reagent for a period of between 30 seconds and 60 minutes.

12. A process as claimed in claim 11, characterised in that the ammoniacal liquor is contacted with the liquid organic solution containing the organic reagent for a period of 3 minutes.

13. A process as claimed in claim 1, characterised in that the nickel loaded organic phase is stripped by contact with the ammoniacal ammonium carbonate solution for a period sufficient to allow the nickel to pass from the organic phase to an aqueous strip liquor phase.

14. A process as claimed in claim 13, characterised in that the contact period is from 30 seconds to 60 minutes.

15. A process as claimed in claim 14, characterised in that the ammoniacal ammonium carbonate strip liquor is contacted with the nickel loaded organic phase for a period of 3 minutes.

16. A process as claimed in claim 1, characterised in that the nickel loaded organic phase is stripped in a stripping cell at a temperature of about 40° C.

17. A process as claimed in claim 13, characterised in that the ammoniacal ammonium carbonate solution contains a total ammonia concentration of from 210 to 300 $gl^{-1}$ and a total carbon dioxide concentration of from 150 to 300 $gl^{-1}$.

18. A process as claimed in claim 17, characterised in that the nickel loaded aqueous strip liquor phase contains an ammonia concentration of about 285 $gl^{-1}$ and a carbon dioxide concentration of about 230 $gl^{-1}$.

19. A process as claimed in claim 1, characterised in that the nickel loaded organic phase is separated from the ammoniacal ammonium carbonate phase containing the cobalt and the nickel stripping process is carried out by means of a conventional batch extraction or continuous mixer settler techniques.

20. A process as claimed in claim 1, characterised in that three extraction and three strip stages are carried out with recycling of the aqueous solution to maintain an aqueous to organic ratio of 1:1 in the mixer boxes.

21. A process as claimed in claim 1, characterised in that the nickel is recovered from the nickel loaded aqueous strip liquor phase as basic nickel carbonate by means of distillation of the liquor.

22. A process as claimed in claim 1, characterised in that the cobalt is recovered from the ammoniacal ammonium carbonate phase by means of steam heating, sulphide addition or ion exchange procedures.

* * * * *